United States Patent
Steffanut et al.

(10) Patent No.: US 11,767,413 B2
(45) Date of Patent: Sep. 26, 2023

(54) PHOSPHONITE COMPOUNDS AS PROCESS STABILIZERS

(71) Applicant: CLARIANT INTERNATIONAL LTD, Muttenz (CH)

(72) Inventors: Pascal Steffanut, Rosenau (FR); Stephane Bellemin-Laponnaz, Strasbourg (FR); Damien Bissessar, Strasbourg (FR); Thierry Achard, Holtzheim (FR)

(73) Assignee: Clariant International Ltd, Muttenz (CH)

( * ) Notice: Subject to any disclaimer, the term of this patent is extended or adjusted under 35 U.S.C. 154(b) by 110 days.

(21) Appl. No.: 17/431,446

(22) PCT Filed: Feb. 20, 2020

(86) PCT No.: PCT/EP2020/054473
§ 371 (c)(1),
(2) Date: Aug. 17, 2021

(87) PCT Pub. No.: WO2020/169730
PCT Pub. Date: Aug. 27, 2020

(65) Prior Publication Data
US 2022/0135771 A1 May 5, 2022

(30) Foreign Application Priority Data
Feb. 21, 2019 (EP) ..................... 19158461

(51) Int. Cl.
*C08K 5/5393* (2006.01)
*C08K 5/5333* (2006.01)

(52) U.S. Cl.
CPC .......... *C08K 5/5393* (2013.01); *C08K 5/5333* (2013.01); *C08L 2201/08* (2013.01); *C08L 2207/062* (2013.01)

(58) Field of Classification Search
CPC . C08K 5/5393; C08K 5/5333; C08L 2201/08; C08L 2207/062
See application file for complete search history.

(56) References Cited

U.S. PATENT DOCUMENTS

| 4,308,218 A | 12/1981 | Hofer et al. |
| 4,406,842 A | 9/1983 | Spivack |
| 5,298,541 A | 3/1994 | Boehshar et al. |
| 2014/0127438 A1 | 5/2014 | Sherman, Jr. et al. |

FOREIGN PATENT DOCUMENTS

| CN | 102718796 A | | 10/2012 |
| CN | 108586522 A | | 9/2018 |
| EP | 0005447 | * | 4/1979 |
| JP | S54-41851 A | | 4/1979 |
| JP | S54-141753 A | | 11/1979 |
| JP | H04-507092 A | | 12/1992 |
| JP | H08-283473 A | | 10/1996 |
| JP | H09-262892 A | | 10/1997 |
| JP | 2011-032255 | * | 2/2011 |

OTHER PUBLICATIONS

Machine English translation of JP 2011-032255, Endo, Feb. 2011.*
International Search Report and Written Opinion dated Sep. 10, 2020, issued in corresponding International Patent Application No. PCT/EP2020/054473.
Extended European Search Report (EESR) dated Aug. 30, 2019, issued in corresponding European Patent Application No. 19158461.4.
"Kunststoff-Additive" [Plastics Additives]—Gächter and Müller, 3rd edition, 1990, p. 42-50.
Office Action (with partial translation) dated Oct. 5, 2022, issued in corresponding Japanese Patent Application No. 2021-548266.

* cited by examiner

*Primary Examiner* — Patrick D Niland
(74) *Attorney, Agent, or Firm* — Morgan, Lewis & Bockius LLP

(57) ABSTRACT

The present invention relates to a composition comprising one or more (co)polymers and one or more phosphonite compounds that contain cardanol moieties. Moreover, the present invention also refers to the use of the phosphonite compounds as process stabilizers, in particular refers to the use of such compounds for stabilizing and/or reducing the Yellowness Index of a (co)polymer composition exposed to heat and/or mechanical stress.

14 Claims, No Drawings

PHOSPHONITE COMPOUNDS AS PROCESS STABILIZERS

The present invention relates to a composition comprising one or more (co)polymers and one or more phosphonite compounds that contain cardanol moieties. Moreover, the present invention also refers to the use of the phosphonite compounds as process stabilizers, in particular refers to the use of such compounds for stabilizing and/or reducing the Yellowness Index of a (co)polymer composition exposed to heat and/or mechanical stress. In other words, the invention relates to novel liquid phosphonite compositions, to methods of preparing such compositions and to stabilized (co)polymeric compositions comprising these phosphonite compositions.

Processing of (co)polymers, in particular thermoplastic (co)polymers, typically involves the exposure of the (co)polymer molding mass to heat and mechanical stress. This often results in undesired yellowing and destabilization of the (co)polymer molding mass. Destabilization may lead to desintegration of the (co)polymer chains and/or to undesired cross-linking of the (co)polymer strands.

Accordingly, it is desired to reduce these side effects. Several classes of process stabilizers are currently used. Inter alia, phosphorus compounds such as phosphites, phosphonates and phosphonites are used as process stabilizers. These stabilizers reduce damage to the (co)polymer through exposure to heat or mechanical stress during processing. These may be liquid or solid.

Solid organic phosphite stabilizers are widely used as secondary antioxidants in (co)polymer compositions. One commercially available antioxidant is tris(2,4-di-t-butylphenyl)phosphite, commonly known as Alkanox™ 240, Irgafos™ 168 or Doverphos™ S-480. This phosphite is a white crystalline solid melting between 180-185° C. and has low volatility that allows for its use at high temperatures commonly required for processing thermoplastic (co)polymers. This phosphite has been demonstrated to, effectively, reduce peroxide induced oxidative degradation for many (co)polymers including polyolefins, polycarbonates, acrylonitrile butadiene styrene (ABS), and polyesters. However, these compounds are still facing processing and compatibility issues in certain (co)polymers like polyethylenes, where liquid process stabilizers are often more desirable.

Liquid derivatives of phosphites such as tris(nonylphenyl) phosphite (TNPP) have been used for years to stabilize polyethylene type (co)polymers against oxidation and color degradation. TNPP has been a standard phosphite that has been used for this application. As their solid form equivalents, phosphites of this type function as stabilizers for (co)polymers and especially synthetic rubbers by reacting with hydroperoxides forming a phosphate and a corresponding alcohol. The reduction of the peroxides slows crosslinking and color degradation.

Unfortunately, liquid organic triphosphites also hydrolyze quite readily by reacting with moisture to form a dialkyl or diaryl hydrogen phosphite. While degrading, this substance are releasing molecules that are promptly migrating at the (co)polymer surface and, from there, in the environment. For the TNPP, the main degradation product is the nonylphenol.

Nonylphenol (in the present context mainly: n-nonylphenol, in particular 4-n-nonylphenol) persists in aquatic environments and is moderately bio accumulative.

It is not readily biodegradable, and it can take months or longer to degrade in surface waters, soils, and sediments. Non biological degradation is negligible. Bioaccumulation is significant in water-dwelling organisms and birds, and nonylphenol has been found in internal organs of certain animals at concentrations of 10 to 1,000 times greater than the surrounding environment. Nonylphenol is considered to cause endocrine disruption in fish by interacting with estrogen receptors and androgen receptors. Nonylphenol causes the feminization of aquatic organisms, decreases male fertility, and decreases survival in young fish. The production and use of nonylphenol and nonyphenol ethoxylates is prohibited in the European Union due to its effects on health and the environment. The authorities have also included NP on the list of priority hazardous substances for surface water in the Water Framework Directive. In 2013, nonylphenols were registered on the REACH candidate list.

To limit its decomposition into nonylphenol, TNPP has been made more hydrolytically stable by the addition of amines such as tris(isopropanol)amine (TiPA). However, this is a non-satisfactory solution since the amine additive is effective only for a short period, and cannot be used for some purposes, such as for example, in a stabilizer composition for polyvinyl chloride (PVC) which may come in contact with food.

Another group of appropriate secondary antioxidant compounds, sometimes even showing better efficiencies than the phosphites are phosphonite stabilizers. One of the commercially available phosphonite antioxidant is known as Hostanox™ P-EPQ.

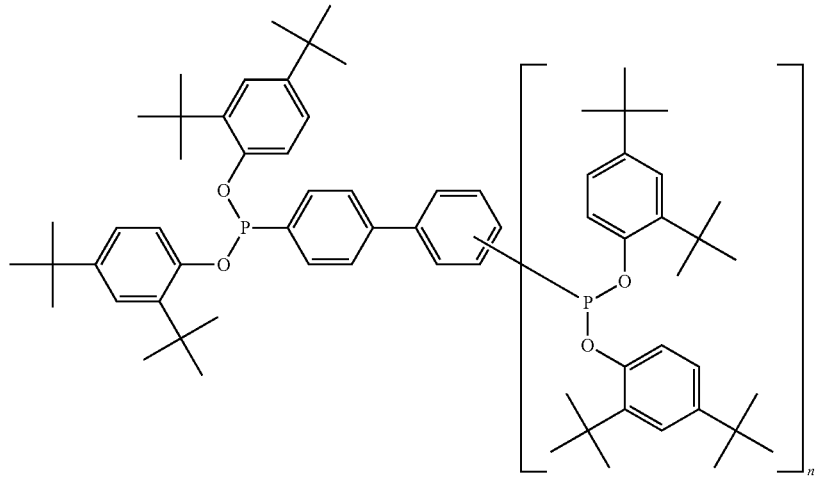

n = 0, 1

This product is synthesized from a bis Friedel-Craft reaction on a biphenyl group using $PCl_3$ as phosphorus source. Besides the excellent overall performances of this phosphonite product in polypropylene, its use in polyethylene is still not optimal and there is an unmet desire for further, preferably liquid, process stabilizers.

Unfortunately, for the most active examples of the above mentioned phosphite and phosphonite compounds, it has been found that there are drawbacks in either application, handling, bioaccumulation or overall efficiency in the use phase.

Therefore, there is still an unmet need to identify further process stabilizers that overcome the above drawbacks. Preferably, these should also be enough versatile to be usable in polypropylene or polyethylene molding masses, and show rather low toxicity.

Surprisingly, it has been found that phosphonite compounds that contain cardanol moieties are very well usable in a variety of molding masses including polyolefins such as polypropylene or polyethylene molding masses. Remarkably, it has been found that low contents thereof in a molding mass, such as a concentration in the range of 300 to 2000 ppm, already leads to significant improvement in a (co) polymer composition exposed to heat and/or mechanical stress. Further, the Yellowness Index has significantly decreased. The compounds of the present invention are liquid at ambient temperature easily synthetically obtainable by reacting the naturally occurring cardanol and dichloroaryl phosphines with another. Cardanol can be obtained from a renewable source as waste from the agro industry. The stability of the compounds of the present invention towards oxidation was found to be better than that of TNPP derivatives. The toxicity of the degradation products is comparably low.

A first aspect of the present invention relates to a composition comprising or consisting of:

A) one or more (co)polymers as component A;
B) one or more phosphonite compounds of formula (I) as component B Formula (I)

wherein, independently of one another each R1 is independently from another a linear $C_{13-17}$-alkyl;

R2 is selected from the group consisting of hydrogen, linear or branched $C_{1-18}$-alkyl, linear or branched $C_{1-12}$-alkoxy; and R3 is selected from the group consisting of hydrogen, linear or branched $C_{1-18}$-alkyl, linear or branched $C_{1-12}$-alkoxy; and C) optionally one or more (co)polymer additives as component C.

It will be understood that the definitions and preferred embodiments as laid out in the context of the use of component B and the methods herein mutatis mutandis apply to a (co)polymer composition.

It will be noticed that the compound of formula (I) comprises cardanol moieties. Cardanol is one of the rare alkyl-phenols naturally occurring compounds that has recently attracted attention for the synthesis of new plasticizers for the (co)polymer industry. Issued from the cashew nut oil, the cardanol is synthesized via a thermal decarboxylation process from the anacardic acid. Cardanol as such, through its phenolic chemical structure and particularly through the steric hindrance brought by the alkyl side chain has been reported to be a suitable compound for antioxidant applications, especially for petroleum-based products. Cardanol, as such, is still slightly colored and contains up to three double bonds in the alkyl chain. The product cardanol we are referring to in the present invention is an hydrogenated and distilled version of the raw cardanol.

The activities reported for the primary antioxidant version (alkylated cardanols) or the secondary version (triscardanol-phosphites) were very low compared to the commercial products like butyl hydroxytoluene (BHT) or TNPP. Therefore, it was a surprising effect that the compound of formula (I) bears a high effectivity in stabilizing (co)polymers molding masses and reduction of the Yellowness Index thereof.

A compound of formula (I) may be obtained by any means. In a preferred embodiment, a compound of formula (I) may be prepared according to the following scheme:

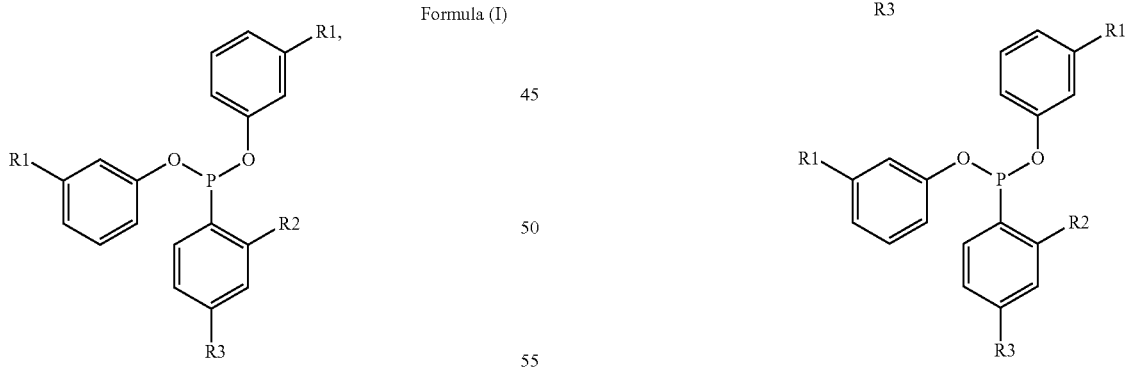

A cardanol compound (meso-R1-phenol; 2-R1-phenol) may be dissolved in a solvent such as, e.g., toluene. Optionally, (anhydrous) pyridine may be added. Then, dichlorophenyl-phosphine or a derivative thereof may be added. The reaction mixture may be heated. Optionally, the compound of formula (I) may be purified.

In a preferred embodiment, R2 and R3 are independently from each other selected from the group consisting of hydrogen, linear or branched $C_{1-4}$-alkyl, linear or branched $C_{1-4}$-alkoxy. In a preferred embodiment, R2 and R3 are both defined equally, i.e. R2=R3. In a preferred embodiment, at least one of R2 and R3 is hydrogen. In a preferred embodiment, R2 and R3 are both hydrogen.

A $C_{1-4}$-alkyl residue may be a methyl, ethyl, propyl, isopropyl, butyl, isobutyl or tert-butyl residue.

In a preferred embodiment, each R1 is independently from another a linear $C_{14-16}$-alkyl. In a preferred embodiment, each R1 is defined equally. In a preferred embodiment, R2 and R3 are both hydrogen and each R1 is a linear $C_{15}$-alkyl.

It will be understood that, in principle, any content of the components A and B and, optionally, C may be used. In a preferred embodiment, the composition of the present invention comprises 300 to 2000 ppm of component B, based on the sum of components A, B and C in the composition. In a preferred embodiment, the composition of the present invention comprises 400 to 1500 ppm, 450 to 1000 ppm, 500 to 1000 ppm, or 500 to 800 ppm, of component B, based on the sum of components A, B and C in the composition. In a preferred embodiment, the composition of the present invention comprises 500 to 700 ppm of component B, based on the sum of components A, B and C in the composition.

In a preferred embodiment, the composition of the present invention comprises or consists of:
A) 49.8 to 99.97% by weight of one or more (co)polymers as component A;
B) 0.03 to 0.2% by weight of one or more phosphonite compounds of formula (I) as defined herein as component B; and
C) 0 to 50% by weight of one or more (co)polymer additives as component C.

In a preferred embodiment, the sum of components A, B and C is 100% by weight.

In a preferred embodiment, the composition of the present invention comprises or consists of:
A) 89.8 to 99.97% by weight of one or more (co)polymers as component A;
B) 0.03 to 0.2% by weight of one or more phosphonite compounds of formula (I) as defined herein as component B; and
C) 0 to 10% by weight of one or more (co)polymer additives as component C.

In a preferred embodiment, the composition of the present invention comprises or consists of:
A) 94.95 to 99.9% by weight of one or more (co)polymers as component A;
B) 0.05 to 0.1% by weight of one or more phosphonite compounds of formula (I) as defined herein as component B; and
C) 0 to 5% by weight of one or more (co)polymer additives as component C.

In a preferred embodiment, the composition of the present invention comprises or consists of:
A) 97.95 to 99.93% by weight of one or more (co)polymers as component A;
B) 0.05 to 0.07% by weight of one or more phosphonite compounds of formula (I) as defined herein as component B; and
C) 0 to 2% by weight of one or more (co)polymer additives as component C.

In a preferred embodiment, the composition of the present invention comprises or consists of:
A) 89.8 to 99.97% by weight of one or more (co)polymers as component A;
B) 0.03 to 0.2% by weight of one or more phosphonite compounds of formula (I) as component B, wherein, independently of one another each R1 is independently from another a linear $C_{15}$-alkyl;
R2 and R3 are both equal and are selected from the group consisting of hydrogen and linear or branched $C_{1-4}$-alkyl; and
C) 0 to 10% by weight of one or more (co)polymer additives as component C.

In a preferred embodiment, the composition of the present invention comprises or consists of:
A) 94.95 to 99.9% by weight of one or more (co)polymers as component A;
B) 0.05 to 0.1% by weight of one or more phosphonite compounds of formula (I) as component B, wherein, independently of one another each R1 is independently from another a linear $C_{15}$-alkyl;
R2 and R3 are both equal and are selected from the group consisting of hydrogen and linear or branched $C_{1-4}$-alkyl; and
C) 0 to 5% by weight of one or more (co)polymer additives as component C.

It will be understood that particularly thermoplastic (co)polymers are typically subjected to heating and/or mechanical stress. This may occur when the (co)polymer mass is, for instance extruded, injection molded, blow formed or the like.

Therefore, in a preferred embodiment, at least one of the one or more (co)polymers as component A is a thermoplastic (co)polymer. In a preferred embodiment, more than 50% by weight of the one or more (co)polymers as component A are one or more thermoplastic (co)polymers. In a preferred embodiment, all of the one or more (co)polymers as component A are thermoplastic (co)polymers.

Accordingly, in a preferred embodiment, the composition of the present invention is a thermoplastic molding mass.

In principle, any (co)polymer, in particular any thermoplastic (co)polymer may be used as component A. In a preferred embodiment, the (co)polymer component A is selected from the group consisting of polyolefins, styrene (co)polymers, polyurethanes, polyesters, polyamides, polyacetals and blends of two or more thereof.

In a preferred embodiment, the (co)polymer component A comprises or consists of one or more polyolefins.

The (co)polymer of component A stabilized by one or more compounds of formula (I) may be any (co)polymer known in the art, such as, e.g., polyolefin homopolymers, thermoplastics, rubbers, polyesters, polyurethanes, polyalkylene terephthalates, polysulfones, polyimides, polyphenylene ethers, styrenic (co)polymers, polycarbonates, acrylic (co)polymers, polyamides, polyacetals, halide-containing (co)polymers, and biodegradable (co)polymers. Mixtures of different (co)polymers, such as polyphenylene ether/styrenic resin blends, polyvinyl chloride/ABS or other impact modified (co)polymers, such as methacrylonitrile and a-methylstyrene containing ABS, and polyester/ABS or polycarbonate/ABS and polyester plus some other impact modifier may also be used as component A.

Such (co)polymers are available commercially or may be made by means well known in the art. However, the compounds of formula (I) of the present invention are particularly useful in thermoplastic (co)polymers, such as polyolefins, polycarbonates, polyesters, polyphenylene ethers and styrenic (co)polymers, due to the extreme temperatures at which thermoplastic (co)polymers are often processed and/or used as component A.

The (co)polymers used as component A in combination with compounds of formula (I) of the present invention may be produced using a variety of (co)polymerization processes including solution, high pressure, slurry and gas phase using various catalysts including Ziegler-Natta, single-site, metallocene or Phillips-type catalysts. Non-limiting (co)polymers useful with the phosphine acrylates compositions include ethylene based (co)polymers such as linear low density polyethylene, elastomers, plastomers, high density polyethylene, substantially linear long chain branched (co)polymers, and low density polyethylene; and propylene based (co)polymers such as polypropylene (co)polymers including atactic, isotactic, and syndiotactic polypropylene (co)polymers, and propylene copolymers such as propylene random, block or impact copolymers.

In a preferred embodiment, the one or more (co)polymers used as component A (e.g., polyolefin-based (co)polymers such as, e.g., ethylene based (co)polymers) have a density in the range of from 0.86 g/cc to 0.97 g/cc, in the range of from 0.88 g/cc to 0.965 g/cc, in the range of from 0.900 g/cc to 0.96 g/cc, in the range of from 0.905 g/cc to 0.95 g/cc, in the range from 0.910 g/cc to 0.940 g/cc, greater than 0.915 g/cc, greater than 0.920 g/cc, and/or greater than 0.925 g/cc. In a preferred embodiment, the one or more (co)polymers used as component A have a molecular weight distribution, a weight average molecular weight to number average molecular weight (Mw/Mn) of greater than 1.5 to about 15, greater than 2 to about 10, greater than about 2.2 to less than about 8, from about 2.2 to less than 5, or from 2.5 to 4. The ratio of Mw/Mn may be measured by gel permeation chromatography techniques well known in the art. In a preferred embodiment, the one or more (co)polymers used as component A have a melt index (MI) or (I2) as measured by ASTM-D-1238-E in the range from 0.01 dg/min to 1000 dg/min, from about 0.01 dg/min to about 100 dg/min, from about 0.1 dg/min to about 50 dg/min, or from about 0.1 dg/min to about 10 dg/min.

In a preferred embodiment, the one or more (co)polymers used as component A are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications.

In a preferred embodiment, the compounds of formula (I) are suitable and/or approved for use in (co)polymers, preferably polyolefins that are used as component A in contact with beverages, foods and other human consumables.

In a preferred embodiment, the one or more (co)polymers used as component A are one or more polyolefins or blends comprising one or more polyolefins. Therefore, polymers of mono-olefins and di-olefins, for example polypropylene, poly-isobutylene, polybutene-1, poly-methylpentene-1, poly-isoprene, or polybutadiene, as well as (co)polymers of cyclo-olefins, for instance of cyclo-pentene or norbornene, polyethylene (which optionally can be cross-linked), for example high density polyethylene (HDPE), low density polyethylene (LDPE) and linear low density polyethylene (LLDPE) may be used as component A. Mixtures of these (co)polymers, for example, mixtures of polypropylene with poly-isobutylene, polypropylene with polyethylene (for example PP/HDPE, PPILDPE) and mixtures of different types of polyethylene (for example LDPE/HDPE), may also be used as component A. Therefore, also useful as component A are copolymers of mono-olefins and di-olefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbomene; as well as mixtures of such copolymers and their mixtures with (co)polymers mentioned above, for example polypropylene/ethylene propylene copolymers, LDPE/EVA, LDPE/EAA, LLDPE/EVA, and LLDPE/EAA.

Olefin (co)polymers may be produced by, for example, (co)polymerization of olefins in the presence of Ziegler-Natta catalysts. Olefin (co)polymers may also be produced utilizing chromium catalysts or single site catalysts, e.g., metallocene catalysts such as, for example, cyclopentadiene complexes of metals such as Ti and Zr. As one skilled in the art would readily appreciate, the polyethylene (co)polymers used as component A herein, e.g., LLDPE, can contain various co-monomers such as, for example, 1-butene, 1-hexene and 1-octene co-monomers.

(Co)polymer may also include styrenic (co)polymers, such as polystyrene, poly-(p-methylstyrene), poly-(a-methylystyrene), copolymers of styrene or a-methylstyrene with dienes or acrylic derivatives, such as, for example, styrene/butadiene (SBR), styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another (co)polymer, such as, for example, from a polyacrylate, a diene (co)polymer or an ethylene/propylene/diene terpolymer; and block copolymers of styrene, such as, for example, styrene/butadiene/styrene (SBS), styrene/isoprene/styrene (SIS), styrene/ethylene/butylene/styrene or styrene/ethylene/propylene/styrene.

Styrenic (co)polymers may additionally or alternatively include graft copolymers of styrene or a-methylstyrene such as, for example, styrene on polybutadiene, styrene on polybutadienestyrene or polybutadiene-acrylonitrile; styrene and acrylonitrile (or methacrylonitrile) or polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Suitable rubbers include both natural rubber and synthetic rubbers, and combinations thereof. Synthetic rubbers include, but are not limited to, for example, thermoplastic rubbers, ethylene/alpha-olefin/non-conjugated polyene (EPDM) rubbers, ethylene/alpha-olefin (EPR) rubbers, styrene/butadiene rubbers, acrylic rubbers, nitrile rubbers, poly-isoprene, polybutadiene, poly-chloroprene, acrylonitrile/butadiene (NBR) rubbers, poly-chloroprene rubbers, polybutadiene rubbers, isobutylene-isoprene copolymers, etc. Thermoplastic rubbers include SIS, solution and emulsion SBS, etc.

Nitrile (co)polymers are also useful in the (co)polymer composition of the invention. These include homo-polymers and copolymers of acrylonitrile and its analogs, such as poly-methacrylonitrile, poly-acrylonitrile, acrylonitrile/butadiene (co)polymers, acrylonitrile/alkyl acrylate (co)polymers, acrylonitrile/alkyl methacrylate/butadiene (co)polymers, and various ABS compositions as referred to above in regard to styrenics.

(Co)polymers based on acrylic acids, such as acrylic acid, methacrylic acid, methyl methacrylic acid and ethacrylic acid and esters thereof may also be used. Such (co)polymers include polymethylmethacrylate, and ABS-type graft copolymers wherein all or part of the acrylonitrile type monomer has been replaced by an acrylic acid ester or an acrylic acid amide. (co)polymers including other acrylic-type monomers, such as acrolein, methacrolein, acrylamide and methacrylamide may also be used as component A.

Halogen-containing (co)polymers may also be stabilized with the one or more compounds of formula (I) of the present invention. These include (co)polymers such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinyl acetate copolymers, vinyl chlorideethylene copolymer, vinyl chloride-propylene copolymer, vinyl chloridestyrene copolymer, vinyl chloride-isobutylene copolymer, vinyl chloride-vinylidene chloride copolymer, vinylchloride styrene-maleic anhydride terpolymer, vinyl chloride-styrene-acrylonitrile copolymer, vinylchloride-butadiene copolymer, vinyl chloride isoprene copolymer, vinyl chloride-chlorinated propylene copolymer, vinyl chloride-vinylidene chloride-vinyl acetate terpolymer, vinylchloride-acrylic acid ester copolymers, vinyl chloride-maleic acid ester copolymers, vinylchloride-methacrylic acid ester copolymers, vinyl chloride-acrylonitrile copolymer and internally plasticized polyvinyl chloride may be used as component A.

Other (co)polymers useful as component A may include homopolymers and copolymers of cyclic ethers, such as polyalkylene glycols, polyethylene oxide, polypropylene oxide or copolymers thereof with bisglycidyl ethers; polyacetals, such as polyoxymethylene and those polyoxymethylene which contain ethylene oxide as a co-monomer; polyacetals modified with thermoplastic polyurethanes, acrylates or methacrylonitrile containing ABS; polyphenylene oxides and sulfides, and mixtures of polyphenylene oxides with polystyrene or polyamides;

polycarbonates and polyestercarbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-2-(2,2,4(4-hydroxyphenyl)-propane} terephthalate and polyhydroxybenzoates as well as block co-polyether-esters derived from polyethers having hydroxyl end groups.

Polyamides and co-polyamides which are derived from bis-amines and dicarboxylic acids and/or from amino-carboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene bis-amine and adipic acid; polyamides prepared from hexamethylene bis-amine and isophthalic or/and terephthalic acid and optionally an elastomer as modifier, for example poly-2,4,4 trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used as component A.

In another embodiment, the (co)polymer comprises a biodegradable (co)polymer or compostable (co)polymer. Biodegradable (co)polymers are those in which the degradation results from the action of naturally occurring microorganisms, such as bacteria, fungi and algae. Compostable (co)polymers undergoes degradation by biological processes during composting to yield $CO_2$, water, inorganic compounds and a biomass at a rate consistent with other compostable materials. Typically, the biodegradable or compostable (co)polymers are derived from plant sources and are synthetically produced. Examples of biodegradable or compostable (co)polymers include poly-(glycolic acid) (PGA}, poly(lactic acid) (PLA), and co-polymers thereof.

Biodegradable or compostable (co)polymers may also be derived from a blend of starch of a plant and a conventional petroleum-based (co)polymer. For example, the biodegradable (co)polymer may be blended with a polyolefin.

Polyolefin, poly-alkylene terephthalate, poly-phenylene ether and styrenic (co)polymers, and mixtures thereof are more preferred, with polyethylene, polypropylene, polyethylene terephthalate, poly-phenylene ether homo-polymers and co-polymers, polystyrene, high impact polystyrene, polycarbonates and ABS-type graft copolymers and mixtures thereof being particularly preferred.

A (co)polymer additive usable as component C may be any (co)polymer additive known in the art. In a preferred embodiment, the composition of the present invention further comprises one or more (co)polymer additives as component C, wherein said (co)polymer additives are selected from the group consisting of antioxidants, acid scavengers UV stabilizers, UV absorbers, UV quenchers, antistatics, flame retardants, lubricants, plasticizers, nucleating agents, metal deactivators, biocides, impact modifiers, fillers, dyes, and pigments.

In a preferred embodiment, the composition of the present invention further comprises one or more (co)polymer additives as component C, wherein said (co)polymer additives are selected from the group consisting of antioxidants, such as sterically hindered phenols, secondary aromatic amines or thioethers, acid scavengers such as sodium stearate, magnesium stearate, zinc stearate, calcium stearate, sodium lactate, magnesium lactate, zinc lactate and calcium lactate, hydrotalcites or alkoxylated amines; UV stabilizers, and also other sterically hindered amines (HALSs) (such as N-unsubstituted, N-alkyl, N—O-alkyl or N-acyl substituted 2,2, 6,6-tetramethylpiperidine compounds) and UV absorbers (such as 2-(2'-hydroxyphenyl)benzotriazoles, 2-hydroxybenzophenones, (2-hydroxyphenyl)triazines, 1,3-bis(2'-hydroxybenzoyl)benzosalicylates, benzylidenemalonates, oxanilides and cinnamates and oxamides), UV quenchers (such as nickel complexes, benzoates and substituted benzoates), antistatics, flame retardants, lubricants, plasticizers, nucleating agents, metal deactivators, biocides, impact modifiers, fillers, dyes, pigments and fungicides.

Other additives which may be added to a (co)polymeric composition formulation of the invention encompass may be such as described in "Kunststoff-Additive" [Plastics Additives]—Gächter and Müller, $3^{rd}$ edition, 1990, p. 42-50).

One of the main criteria for successful stabilizing action in the melt is the maintenance of the essential initial molecular weight of the (co)polymer after the (co)polymer has been processed and, respectively, the technical determination of the same by measuring the melt flow index (MFI) as well as measuring the discoloration arising because of processing.

Preferably, the alteration of the melt flow index (MFI) (MFI; 230° C., 2.16 kg) (ASTM D-1238-70) observable upon exposure of the (co)polymer composition of the present invention to heat and/or mechanical stress is lower than that observable for a comparable (co)polymer composition without the compound of formula (I).

Preferably, the alteration of the Yellowness Index (YI) (ASTM D1925-70) observable upon exposure of the (co) polymer composition of the present invention to heat and/or mechanical stress is lower than that observable for a comparable (co)polymer composition without the compound of formula (I).

As far as not defined otherwise, the ASTM norms mentioned herein refer to the ASTM norms in force and up-to-date on May 1, 2018).

As indicated above, component B according to the present invention (i.e., one or more compounds of formula (I) as defined herein) may serve as process stabilizing agent.

Accordingly, a further aspect of the present invention relates to the use of a component B according to the present invention for stabilizing and/or reducing the Yellowness Index of a (co)polymer composition exposed to heat and/or mechanical stress.

It will be understood that the definitions and preferred embodiments as laid out in the context of the composition of the present invention above mutatis mutandis apply to the use of component B. In a preferred embodiment, the (co) polymer composition comprises one or more polyolefins as component A, in particular wherein the composition is defined as laid out above.

The (co)polymer composition preferably comprises a (co)polymer component A as defined herein. Preferably, the (co)polymer composition is a composition according to the present invention.

As used herein, stabilizing a (co)polymer composition may be understood in the broadest sense as any prevention or diminishing of (undesired) structural changes in the molecular structure of the (co)polymer upon processing. One criterion for successful stabilizing action in the melt is the improved maintenance of the initial molecular weight of the (co)polymer after the (co)polymer has been processed and, respectively, the technical determination of the same by measuring the melt flow index (MFI) (e.g., determined at 230° C., 2.16 kg according to ASTM D-1238-70) as well as measuring the discoloration arising as a result of processing. Improved maintenance of the initial molecular weight is preferably improvement in comparison to a comparable composition lacking component B of the present invention. In a preferred embodiment, the melt flow index (MFI) (e.g., determined at 230° C., 2.16 kg according to ASTM D-1238-70) does not alter more than 75% when a melt of the (co)polymer component A is processed (e.g., processed once at a temperature of 180-300° C.). In a preferred embodiment, the melt flow index (MFI) (e.g., determined at 230° C., 2.16 kg according to ASTM D-1238-70) does not alter more than 50% or nor more than 25% when a melt of the (co)polymer component A is processed (e.g., processed once at a temperature of 180-300° C.).

The one or more compounds according to formula (I) (component B) may be added to the (co)polymeric material (component A) and optionally the one or more (co)polymer additives (component C) prior to, during or following the preparation process and the addition may use a solid or molten form or a solution or suspension, preferably a liquid concentrate comprising from 10 to 80% by weight of the one or more compounds according to formula (I) (component B) and from 90 to 20% by weight of the solvent or a solid concentrate composition (masterbatch) comprising from 10 to 80% by weight (in particular from 40 to 70% by weight) of component B and from 90 to 20% by weight (in particular from 60 to 30% by weight) of a solid (co)polymeric material which is identical or compatible with the material to be stabilized (i.e., component A). Depending on the (co)polymer type, such decomposition may lead to an undesired reduction of chain length (typically decreasing viscosity of the melt) and/or to an undesired crosslinking of (co)polymer strands (typically increasing viscosity of the melt). The viscosity of the (co)polymer melt at a given temperature may alter.

An additional or alternative criterion for successful stabilizing action in the melt is the improved maintenance of color of the (co)polymer after the (co)polymer has been processed and, respectively, the technical determination of the same by measuring the yellowness index (e.g., according to ASTM D1925-70). Improved maintenance of the color is preferably improvement in comparison to a comparable composition lacking component B of the present invention. In a preferred embodiment, the yellowness index (e.g., according to ASTM D1925-70) does not alter more than 75% when a melt of the (co)polymer component A is processed (e.g., processed once at a temperature of 180-300° C.). In a preferred embodiment, the yellowness index (e.g., according to ASTM D1925-70) does not alter more than 50% or not more than 25% when a melt of the (co)polymer component A is processed (e.g., processed once at a temperature of 180-300° C.).

In a preferred embodiment, 300 to 2000 ppm, 400 to 1500 ppm, 450 to 1000 ppm, 500 to 1000 ppm, 500 to 800 ppm, or 500 to 700 ppm, of component B, based on the sum of components A, B and C in the composition, are used.

In a preferred embodiment, the (co)polymer composition comprises one or more polyolefins as component A, in particular wherein the composition is defined as laid out in more detail herein.

It will be understood that articles and products may be prepared by the composition of the present invention. Therefore, a further aspect of the present invention relates to an article or product comprising or consisting of the composition of the present invention.

It will be understood that the definitions and preferred embodiments as laid out in the context of the composition of the present invention above mutatis mutandis apply to an article or product comprising such or consisting thereof.

In a preferred embodiment, an article or product of the present invention may be prepared by film, sheet, or fiber (co)extrusion, blow molding, injection molding or rotary molding. Films may include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include melt spinning, solution spinning and melt blown fiber operations for use in woven or nonwoven form to make filters, diaper fabrics, medical garments, geotextiles, etc. Extruded articles include medical tubing, wire and cable coatings, geomembranes, and pond liners. Molded articles may include single and multi-layered constructions in the form of bottles, tanks, large hollow articles, rigid food containers and toys, etc. In addition to the above, the compounds of formula (I) may be used in various rubber based products such as tires, barriers and the like.

A still further aspect of the present invention relates to a method for stabilizing and/or reducing the Yellowness Index of a (co)polymer composition exposed to heat and/or mechanical stress during processing, wherein said method comprises the steps of (i) providing one or more (co)polymers as component A and one or more phosphonite compounds of formula (I) as component B according to the present invention, and optionally one or more (co)polymer additives; and (ii) melt processing the one or more (co)polymers of component A in the presence of component B.

It will be understood that the definitions and preferred embodiments as laid out in the context of the composition of the present invention and the use of component B above mutatis mutandis apply to a method for stabilizing a (co)polymer composition. In a preferred embodiment, the (co)polymer composition comprises one or more polyolefins as component A, in particular wherein the composition is defined as laid out above.

The temperature of melt processing the one or more (co)polymers of component A depends on the one or more (co)polymers used. Often, such temperature will be in the range of between 180 and 300° C. For example, it may be in the range of from 200 to 280° C. In a preferred embodiment, the step of melt processing involves extrusion, blow-forming and/or injection molding.

The one or more compounds of formula (I) (component B) may be added to the (co)polymeric material prior to, during or following the preparation process and the addition may use directly the liquid material or a concentrate comprising from 10 to 80% by weight of the inventive compound and from 90 to 20% by weight of the solvent or a solid concentrate composition (masterbatch) comprising from 10 to 80% by weight (in particular from 40 to 70% by weight) of component B and from 90 to 20% by weight (in particular from 60 to 30% by weight) of a solid (co)polymeric material which is identical or compatible with the material to be stabilized (component A).

Moreover, the one or more compounds of formula (I) may be added in the form of a liquid mixture with other additives, e.g. those of component C. These mixtures, also designated as blends, may be prepared by mixing the liquid phosphonites, together with solid or liquid primary antioxidants, light or UV stabilizers or other additives of component C. Mixing may be performed by mixing the powders, compacting, extrusion or melt pelletization or a similar method.

A still further aspect of the present invention relates to a method for preparing a composition of the present invention, wherein said method comprises the steps of (i) providing one or more (co)polymers as component A and one or more diphenylphosphino compounds as component B according to the present invention; and (ii) melt processing the one or more (co)polymers of component A in the presence of component B.

It will be understood that the definitions and preferred embodiments as laid out in the context of the composition of the present invention, the use of component B and a method for stabilizing a (co)polymer composition above mutatis mutandis apply to any of the methods for preparing such.

The Examples depicted below illustrate further embodiments of the present invention.

EXAMPLES

Synthesis of the Compounds of Formula (I)

Cardanol was hydrogenated and distilled off before use. Under nitrogen, purified cardanol (3.57 g, 11.73 mmol) was dissolved in 15 ml of anhydrous toluene. After stirring for 10 minutes, anhydrous pyridine (1.13 ml, 13.97 mmol) was added to the solution and the mixture was stirred for 15 minutes. Dichloro-phenyl-phosphine (1 g, 5.59 mmol) was then added dropwise to the reaction medium at low temperature (0° C.). A white precipitate appeared instantaneously during the addition that corresponds to the pyridinium salt. The reaction medium was then heated to 40° C. for an additional period of 4 hours. The completion of the reaction was controlled by gas chromatography and the reaction mixture was filtered under argon to remove the salts; the solution was then evaporated to give a colourless oil with a yield in pure substance at 85%.

Application in Polypropylene During Processing

It is useful to manually mix/distribute liquid ingredients with some part of the resin (powder) before further mix the whole batch in Kenwood mixer. Additives which are not available in powder form have to be crushed before further mixing with all other ingredients in the Kenwood mixer.

Pre-extrusion was carried out by means of a Collin single screw extruder with water bath. A screw configuration with diameter 30, compression ratio 1:4 and L/D ratio 25 was chosen. The die had a diameter of 3 mm and was operating with a crew speed of 70 rpm. Cooling takes place in water.

Pelletization takes place with high-speed mode (Pelletizer T1). Procedure: Single pass compounding, taking sample as pass 0.

A (co)polymeric composition comprising:
99.78 parts of polypropylene
0.05 part of Hostanox O 10®
0.10 part of calcium stearate
0.07 part of inventive compound was mixed by dry mixing and pre-extrusion at 210° C. The composition was then repeatedly extruded at a temperature of 270° C. and pelletized in a water bath after cooling of the (co)polymer melt. The melt flow index (MFI; 230° C., 2.16 kg) (ASTM D-1238-70) and the Yellowness Index (YI) (ASTM D1925-70) using pellets were determined after the first, third and fifth pass.

Melt Flow Rate (MFR):
Instrument: CEAST MF50 Advanced Melt Flow tester, Multi-weight Instrument
Setup (according to ISO 1133B); bore temperature: 230° C.
Measure mode type: position
Measure start position: 50.00 mm.
Measure end position: 20.00 mm.
Measurement Details:
measure load: 2.16 kg; measure length: 13 mm. measure steps: 15. measure melt density: 0.740 g/cm³; die diameter: 2.095 mm.

Compacting:
compacting delay: 30; compacting force: 21.6 kg; compacting quote: 52 mm; weight apply delay: 240 s; sample weight: 4 g.

Color:
Measuring colorimetric values (L*, a*, b*, YI and dE); instrument: Spectrophotometer Minolta, model 3600d, mode: Reflectance SCE Hostanox O 10 (producer Clariant Corp.) is a highly established tetrafunctional sterically hindered phenol which mainly acts as long-term thermal stabilizer in various technical polymers. This phenol is produced and commercialized under numerous brandnames (e.g., Hostanox O 10 Songnox 1010, Inganox 1010, Anox 20):

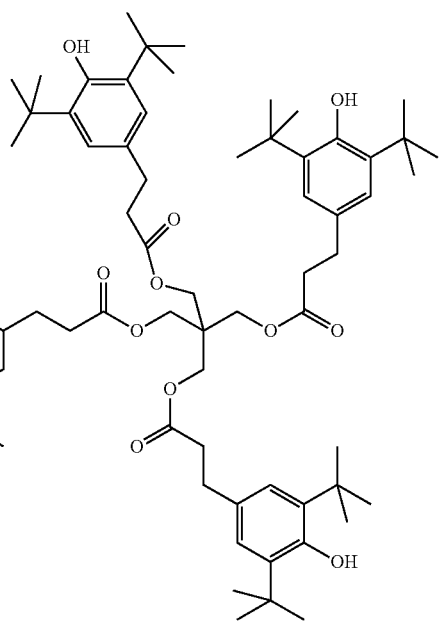

Hostanox P-EPQ (producer Clariant Corp.) is a well-established bifunctional organophosphonite which acts as stabilizer during processing of certain technical polymers, particularly of polyolefins:

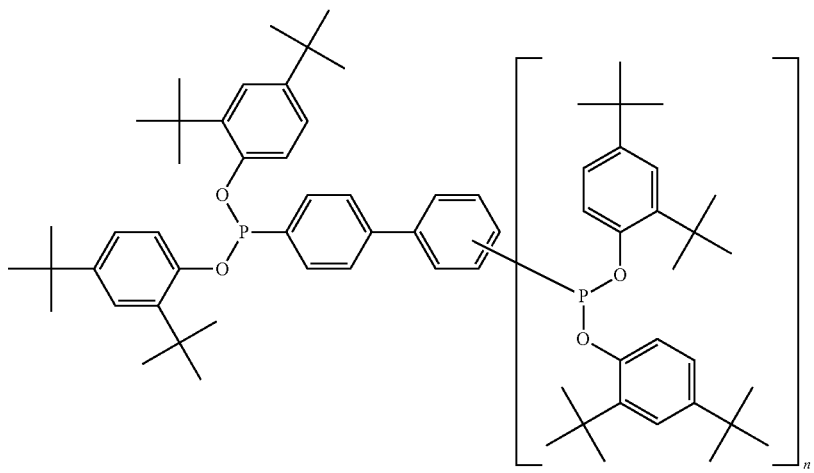

Hostanox® P-EPQ® n = 0, 1

Everfos 168 (also: PS 168) is phosphite stabilizer 168. This is a commercial stabilizer (Ciba Irgafos 168) that is, chemically, tris(2,4-ditert-butylphenyl)phosphite.

TABLE 1

Effectiveness of compounds of formula (I) on processed polypropylene (PP) with regard to melt flow rate (MFR) and Yellowness Index (YI) in comparison to established stabilizers.
Polypropylene (Nonstabilized Trilene HF 2.0 BM)

|  | Ex. No. | Qty [ppm] | MFR [g/10 min] | | | YI | | |
| --- | --- | --- | --- | --- | --- | --- | --- | --- |
|  |  |  | $1^{st}$ pass | $3^{rd}$ pass | $5^{th}$ pass | $1^{st}$ pass | $3^{rd}$ pass | $5^{th}$ pass |
| CaSt/AO1010 |  | 1000/500 | — | — | — | — | — | — |
| None |  | 0 | 8.344 | 15.763 | 24.527 | 4.44 | 6.39 | 8.93 |
| Everfos 168 | 1 | 1000 | 3.459 | 4.710 | 6.386 | 2.14 | 5.09 | 7.66 |
| Hostanox P-EPQ | 2 | 700 | 3.098 | 3.603 | 4.606 | 0.85 | 3.35 | 5.06 |
| Compound (I) | 3 | 700 | 4.210 | 6.060 | 7.725 | 13.41 | 22.24 | 29.28 |
| Compound (II) | 4 | 1000 | 4.140 | 7.264 | 10.260 | 7.46 | 14.07 | 17.41 |
| Compound (III) | 5 | 1500 | 3.711 | 5.347 | 7.697 | 3.15 | 6.74 | 11.54 |

The following conclusions can be drawn from these results:

Polypropylene degrades with reduction of chain length and therefore of viscosity, giving an increase in MFR values. The given cardanol phosphonites of formula (I) can act as antioxidant to protect the degradation of polypropylene. Compared with well-established commercial phosphites like Irgafos 168, organo-phosphonite like Hostanox P-EPQ®, the given cardanol phosphonites of formula (I) show somewhat lower performance on MFR retention and somewhat higher color value (YI), but are still effective stabilizers.

Application in Linear Low Density Polyethylene (LLDPE)

In a (co)polymeric composition comprising
99.83 parts of linear-low-density polyethylene (LLDPE)
0.05 part of Hostanox O 16®
0.05 part of Zinc stearate
0.07 part of inventive compound the components were mixed by dry mixing and pre-extrusion at 190° C. The composition was then repeatedly extruded at a temperature of 240° C. and pelletized in a water bath after cooling of the (co)polymer melt. The melt flow index (MFI) (ASTM D-1238-70, 190° C./2.16 kg) and the Yellowness Index (YI) (ASTM D1925-70) on pellets) were determined after the first, third and fifth pass.

The following conclusions may be drawn from these results:

LLDPE usually degrades by means of crosslinking. Therefore with a rise in viscosity, lower MFI values are measured.

The given cardanol phosphonites of formula (I) can act as antioxidant to protect the degradation of LLDPE. Compared with well-established commercial phosphites like Irgafos 168, organo-phosphonite like Hostanox P-EPQ®, the given cardanol phosphonites of formula (I) show lower performance on MFR retention Towards retention of color particularly the compounds of formula (I) exhibit comparable performance than other phosphite and organo-phosphonite.

High Density Polyethylene (HDPE)

Example HDPE-1

A polymeric composition comprising

| 99.78 | parts of high-density polyethylene (HDPE) |
| --- | --- |
| 0.05 | part of Hostanox O 10 ® |
| 0.10 | part of calcium stearate |
| 0.07 | part of inventive compound |

TABLE 2

Effectiveness of compounds of formula (I) on processed Linear Low Density Polyethylene (LLDPE) with regard to melt flow rate (MFR) and Yellowness Index (YI) in comparison to established stabilizers.
Linear Low Density Polyethylene (Nonstabilized LLDPE DGM 1810)

|  | Ex. No. | Qty [ppm] | MFR [g/10 min] | | | YI | | |
| --- | --- | --- | --- | --- | --- | --- | --- | --- |
|  |  |  | $1^{st}$ pass | $3^{rd}$ pass | $5^{th}$ pass | $1^{st}$ pass | $3^{rd}$ pass | $5^{th}$ pass |
| ZnSt/AO 1076 |  | 500/500 | — | — | — | — | — | — |
| None |  | 0 | 0.574 | 0.525 | 0.485 | −1.43 | −0.97 | −0.20 |
| Everfos 168 | 1 | 1200 | 0.866 | 0.816 | 0.752 | −0.23 | −0.01 | 0.60 |
| Hostanox P-EPQ | 2 | 700 | 0.889 | 0.828 | 0.680 | −0.99 | 0.73 | 1.36 |
| TNPP | 3 | 1200 | 0.867 | 0.798 | 0.721 | −0.29 | 0.54 | 1.01 |
| Compound (I) | 4 | 700 | 0.757 | 0.630 | 0.562 | 0.21 | 0.62 | 1.23 |
| Compound (II) | 5 | 1000 | 0.819 | 0.686 | 0.608 | 0.20 | 1.23 | 1.79 |
| Compound (III) | 6 | 1500 | 0.882 | 0.769 | 0.663 | 0.17 | 1.91 | 3.09 | were mixed by dry mixing and pre-extrusion at 190° C. The composition was then repeatedly extruded at a temperature of 270° C. and pelletized in a water bath after cooling of the (co)polymer melt. The melt flow index (MFI) (190° C./2.16 kg) (ASTM D-1238-70) and the Yellowness Index (YI) (ASTM D1925-70) on pellets were determined after the first, third and fifth pass.

TABLE 3

Effectiveness of compounds of formula (I) on processed High Density Polyethylene (HDPE) with regard to melt flow rate (MFR) and Yellowness Index (YI) in comparison to established stabilizers.
High Density Polyethylene (Nonstabilized InnoPlus HD2308J)

| | | MFR [g/10 min] | | | YI | | |
|---|---|---|---|---|---|---|---|
| Ex. No. | Qty [ppm] | 1st pass | 3rd pass | 5th pass | 1st pass | 3rd pass | 5th pass |
| CaSt/AO1010 | 1000/500 | | | | | | |
| None | 0 | 6.493 | 8.156 | 10.047 | 2.66 | 4.75 | 6.42 |
| Irgafos 168 | 1 | 1000 | 6.352 | 6.744 | 7.332 | 3.62 | 6.26 | 7.51 |
| Hostanox P-EPQ | 2 | 700 | 6.301 | 6.501 | 7.378 | −0.03 | 1.36 | 4.05 |
| Compound (I) | 3 | 700 | 6.341 | 7.256 | 8.685 | 3.21 | 4.99 | 6.07 |
| Compound (II) | 4 | 1000 | 6.324 | 6.859 | 8.117 | 1.96 | 4.71 | 6.25 |
| Compound (III) | 5 | 1300 | 6.320 | 6.763 | 7.709 | −0.33 | 4.01 | 5.54 |

The following conclusions may be drawn from these results of Examples HDPE-1 to HDPE-5: The given cardanol phosphonites of formula (I) can act as antioxidant to protect the degradation of HDPE. Compared with well-established commercial phosphites like Irgafos 168, the given cardanol phosphonites of formula (I) show slightly lower performance on MFR retention but better color value (YI) even at lower amount of phosphorus equivalent. Increase concentration of the cardanol phosphonites provides better improvement of color value (YI) and MFR retention of HDPE.

The invention claimed is:

1. A composition comprising:
A) one or more (co)polymers as component A;
B) one or more phosphonite compounds of formula (I) as component B

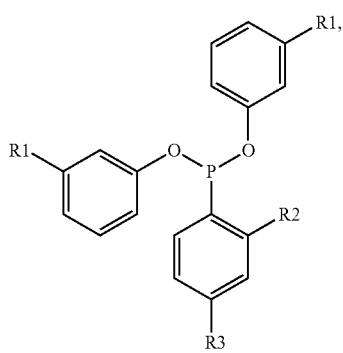

Formula (I)

wherein, independently of one another
each R1 is independently from another a linear C13-17-alkyl;
R2 is selected from the group consisting of hydrogen, linear or branched $C_{1-18}$-alkyl, linear or branched $C_{1-12}$-alkoxy; and
R3 is selected from the group consisting of hydrogen, linear or branched $C_{1-18}$-alkyl, linear or branched $C_{1-12}$-alkoxy; and
C) optionally one or more (co)polymer additives as component C.

2. The composition of claim 1, wherein R2 and R3 are independently from each other selected from the group consisting of hydrogen, linear or branched $C_{1-4}$-alkyl, linear or branched $C_{1-4}$-alkoxy.

3. The composition of claim 1, wherein R2 and R3 are both hydrogen.

4. The composition of claim 1, wherein R2 and R3 are both hydrogen and each R1 is a linear $C_{15}$-alkyl.

5. The composition of claim 1, wherein said composition comprises 300 to 2000 ppm of component B, based on the sum of components A, B and C in the composition.

6. The composition of claim 1, wherein said composition is a thermoplastic molding mass.

7. The composition of claim 1, wherein the (co)polymer component A is selected from the group consisting of polyolefins, styrene (co)polymers, polyurethanes, polyesters, polyamides, polyacetals and blends of two or more thereof.

8. The composition of claim 1, wherein said composition comprises or consists of:
A) 89.8 to 99.97% by weight of one or more (co)polymers as component A;
B) 0.03 to 0.2% by weight of one or more phosphonite compounds of formula (I) as component B; and
C) 0 to 10% by weight of one or more (co)polymer additives as component C.

9. The composition of claim 1, wherein said composition comprises or consists of:
A) 94.95 to 99.9% by weight of one or more (co)polymers as component A;
B) 0.05 to 0.1% by weight of one or more phosphonite compounds of formula (I) as component B, wherein, independently of one another
each R1 is independently from another a linear $C_{15}$-alkyl;
R2 and R3 are both equal and are selected from the group consisting of hydrogen and linear or branched $C_{1-4}$-alkyl; and C) 0 to 5% by weight of one or more (co)polymer additives as component C.

10. The composition of claim 1, wherein said composition comprises 500 to 700 ppm of component B, based on the sum of components A, B and C in the composition.

11. The composition of claim 1, wherein said composition further comprises one or more (co)polymer additives as component C selected from the group consisting of antioxidants, acid scavengers UV stabilizers, UV absorbers, UV quenchers, antistatics, flame retardants, lubricants, plasticizers, nucleating agents, metal deactivators, biocides, impact modifiers, fillers, dyes, and pigments.

12. A method for stabilizing and/or reducing the Yellowness Index of a (co)polymer composition exposed to heat and/or mechanical stress during processing, wherein said method comprises the steps of:
   (i) providing one or more (co)polymers as component A and one or more phosphonite compounds of formula (I) as component B according to claim 1, and optionally one or more (co)polymer additives; and
   (ii) melt processing the one or more (co)polymers of component A in the presence of component B.

13. The method of claim 12, wherein 300 to 2000 ppm of component B, based on the sum of components A, B and C in the composition, are used.

14. The method of claim 12, wherein the (co)polymer composition comprises one or more polyolefins as component A.

\* \* \* \* \*